United States Patent

[11] 3,619,201

| [72] | Inventors | Thomas E. Archer<br>Woodland;<br>Donald G. Crosby, Davis, both of Calif. |
|------|-----------|---|
| [21] | Appl. No. | 677,543 |
| [22] | Filed | Oct. 24, 1967 |
| [45] | Patented | Nov. 9, 1971 |
| [73] | Assignee | The Regents of the University of California |

[54] PESTICIDE DECONTAMINATION OF ANIMAL FEED AND FOODS
9 Claims, 1 Drawing Fig.

[52] U.S. Cl. .................................................. 99/2 R,
99/8, 99/215
[51] Int. Cl. .................................................. A23k 1/00
[50] Field of Search .......................................... 99/8, 103,
100, 2, 2 OE, 10, 17, 199, 215; 131/140, 142, 143;
47/58; 127/34, 37, 39; 162/12, 100, 173; 134/25,
37; 21/57, 58; 34/37; 260/412.4

[56] References Cited
UNITED STATES PATENTS

| 1,975,361 | 10/1934 | Henry............................ | 99/103 |
| 2,160,831 | 6/1939 | Colby et al..................... | 34/37 |
| 2,435,218 | 2/1948 | Hudson........................... | 34/37 |
| 2,474,915 | 7/1949 | Ramont.......................... | 99/103 |
| 2,801,955 | 8/1957 | Rutenberg et al. ........... | 127/37 |
| 2,892,717 | 6/1959 | McLellan ....................... | 99/8 |
| 3,204,641 | 9/1965 | Jones.............................. | 131/140 |
| 3,305,441 | 2/1967 | Kohn.............................. | 99/103 |
| 3,362,888 | 1/1968 | Ricigliano ..................... | 34/37 |

*Primary Examiner*—Norman Yudkoff
*Assistant Examiner*—Curtis P. Ribando
*Attorney*—Townsend and Townsend

ABSTRACT: Reduction and elimination of agricultural chemicals whose permanent presence is undesirable in plant materials. The process involves one or more steps including (1) chemical destruction of agricultural chemical residues by treatment with hot alkali-alkanol wash, (2) wash of plant materials with solvent vapor, and (3) rapid dehydration of plant materials having a relatively high water content.

PATENTED NOV 9 1971　　　　　　　　　　　　3,619,201
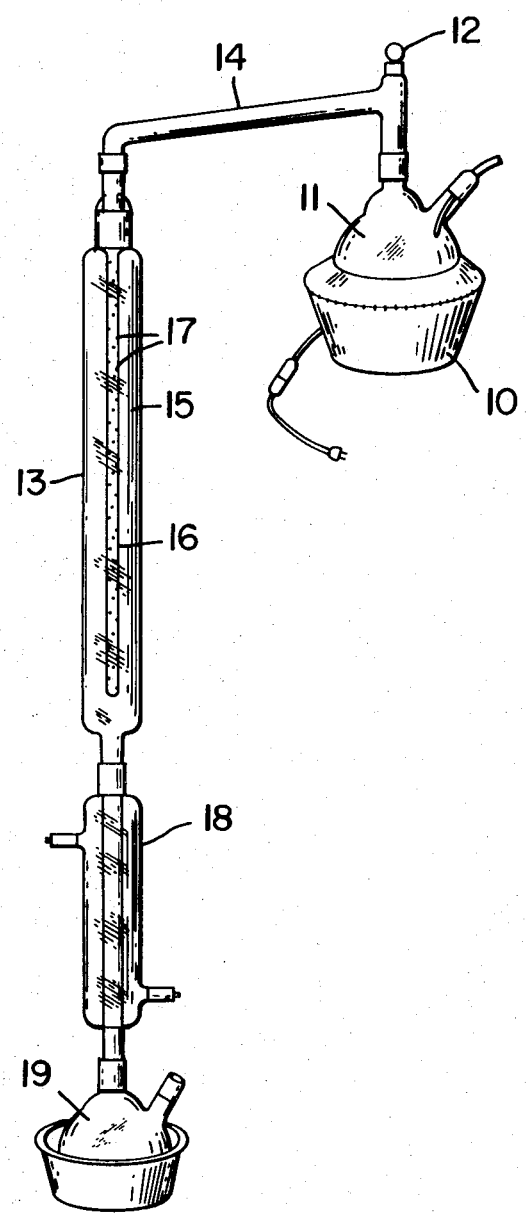
INVENTORS
THOMAS E. ARCHER
BY DONALD G. CROSBY
*Townsend and Townsend*
ATTORNEYS

PESTICIDE DECONTAMINATION OF ANIMAL FEED AND FOODS

This invention relates to methods for removing or reducing in quantity the level of agricultural chemicals such as pesticides in plant materials. Plant materials so treated may be made to meet legal requirements for marketing and be made safe from a health standpoint for consumption by animals and humans.

Various agricultural products are now routinely treated with agricultural chemicals to promote and enhance growth and yields of crops. Frequently the treated agricultural products become contaminated by a legally excessive level of chemicals so as to constitute a health hazard when consumed. Such contamination in agricultural products such as animal feeds contaminated by pesticides is a problem of major economic importance. Loss of a crop has often been due to the presence of pesticide residues only slightly in excess of those legally permitted. For example the maximum amount of the insecticide DDT permitted on alfalfa hay is 0.5 parts per million. Quantities of hay have been lost because of DDT levels of between 0.6 and 1.0 parts per million.

Many commercial animal feeds contain residues of DDT and related chlorinated hydrocarbon insecticides (DDT-RCH) in the low parts-per-million range. Pesticides pass rapidly from feeds through the animal and into the milk, eggs, and other animal products. Once established in the byproducts the contamination can not be eliminated immediately simply by withdrawing the contaminated feed. This uptake of DDT and other chlorinated hydrocarbon residues from feed and the subsequent appearance of the pesticide in the milk fat for example has been extensively reported in the literature.

The present invention provides methods for completely removing or decontaminating by substantial reduction in the level of the undesirable chemical residues in plant materials such as animal feeds to improve both the value of the crop as a marketable commodity and the potential marketability of animal products containing chemical residues from the feed source of the animal.

The invention has application to contaminated plant materials without reference as to how the excessive level of the chemical contamination occurred. Thus, the invention is contemplated as having particular value in instances where an accidental contamination has occurred such as from an accidental overapplication of a chemical to a crop or from the drifting of chemicals being applied to adjacent fields. When the practicality of the present invention becomes more widely accepted, it is contemplate that the use of pesticides in quantities currently legally prohibited may be permitted because the resulting residues can be readily reduced. In addition, the present method makes possible the use of longer lasting pesticides which are not presently legally useful. These latter types of materials can be removed or effectively reduced as desired by the present invention so that the reason for their being objected to will no longer exist.

In the preferred embodiment animal feeds, and particularly those used in the dairy industry, as a feed for cattle, poultry and the like, are reclaimed by reducing the pesticide contamination level to an amount suitable for dairy use by establishing a minimum water content in the contaminated dairy feed of at least about 75 percent by weight thereof. The hydrated feed is then dehydrated by exposing it to an elevated temperature for a time sufficient to substantially dry the feed (the term "dry" is used herein to refer to a condition normally considered dry although a residual water content of about 5–10 percent by weight may still exist). As will be demonstrated by experimental results hereinafter where the contaminated feed having the minimum water content noted is exposed to a temperature preferably above about 2000° F. such as 2300° F. for a short period of time of about 2–5 minutes, a 50 percent or greater reduction of chlorinated hydrocarbon residue has been achieved. While such results are obtainable with the minimum moisture content of about 75 percent by weight, the process is significantly improved where a maximum of water is present in the feed. In this aspect it is preferred to combine sufficient water with the contaminated feed so as to saturate the feed with water before executing the dehydration operation.

The dehydration operation described may be sufficient to reclaim an otherwise unusable agricultural product without further treatment. Generally, however, where the pesticidal contamination is greater than one part per million, another operation in combination with the dehydration step will be used to achieve the necessary reduction.

In this regard many pesticides are known to be soluble in aqueous solutions of ethanol or other low molecular weight alkanols and are unstable in the presence of heated alkali. Such commercial pesticides as Thiodan [6,7,8,9,10-Hexachloro-1,5,5a,6,9,9a-hexahydro-6,9-methano-2,4,3-benzo-dioxathiepin-3-oxide], Kelthane [1,1-bis (p-chlorophenyl)-2,2,2-trichloroethanol] and Aramite [2-(p-tert-Butylphenoxy)-isopropyl 2-chloroethyl sulfite] are alkali unstable and are decomposed into innocuous substances by alkali. These properties of a number of pesticides are used in the present method for achieving decontamination. In the present method, preferably prior to the above dehydration steps, an aqueous alkali is applied to the contaminated plant materials at a sufficiently elevated temperature to cause decomposition of the pesticides. The feed is then washed with water to remove residual alkali. The final washing conveniently will leave 75 percent or more water in the feed so that it is ready for dehydration. The two steps together will often achieve an optimum result in the treatment of alkali unstable contaminations.

For best results the alkali treatment is with an aqueous solution of alkali such as potassium hydroxide or sodium carbonate to impart an alkaline pH of at least 9. In addition the alkali solution is preferably combined with a suitable lower alkanol, the alkanol constituting 50–95 percent by weight of the combination.

Another step in the treatment of contaminated plant materials which may be used in combination with the dehydration treatment, in addition to or instead of the alkali-alkanol treatment, is a treatment with solvent vapors to "wash" contaminants from the plant materials. In this aspect of the process a selected solvent, which may be water or a convenient organic solvent such as pentane, benzene or isopropanol, is vaporized and the vapors contacted with the contaminated plant materials. The solvent is maintained in the vapor phase without condensation on the plant materials. The vapor is maintained at a temperature at which the contaminating pesticide has an appreciable vapor pressure so that it gradually vaporizes as solvent vapor is contacted with the plant material. By flowing the solvent vapor outwardly from the plant material, contaminant vapor will be carried along with it. By continuing this operation and passing a suitable volume of the solvent vapor through the plant material, substantial reductions in the contamination level approaching 100 percent have been achieved.

In the preferred embodiment sufficient solvent vapor, which may be considered a carrier gas in this context, is used to cause at least a 50 percent reduction in the pesticide concentration. Excellent results have been obtained where the solvent vapor volume is about 20 liters per kilogram of material being treated.

The accompanying drawing schematically illustrates apparatus suitable for practicing the vapor washing aspect of the present method.

The three treatments described generally above, dehydration, alkali-alkanol wash, and solvent vapor wash are differently effective depending upon the type of pesticidal contamination and its level. Whereas the alkali-alkanol treatment is most effective with alkali-unstable materials, the dehydration technique is most effective where the contamination level is relatively high. The solvent vapor treatment is generally widely effective at all levels of contamination. Where the contamination problem is known as to type and concentration, one or more of the three steps can be selected for optimum effectiveness. In the usual case the farmer with a contamination problem known only that the problem exists, but is not aware of the specific contaminants which have come from applications in adjacent areas that have been carried by the wind. In such a situation a preferred technique may be to use all three of the steps including the chemical treatment, vapor wash, and dehydration. In many situations the chemical treatment and dehydration, or the solvent vapor wash and dehydration will suffice even with unidentified contamination problems.

In the above discussion reference has been made to agricultural and plant materials in general since the process is broadly applicable. However, while fruits and vegetables present occasional problems, the present invention is of great present application to animal feeds such as alfalfa products, seed products, beet pulp, pomace, nut hulls, and the like, particularly where these are directed to the dairy industry as a feed.

The effectiveness of the present invention will be illustrated with reference to the treatment of alfalfa hay as typical of the plant materials, which may be treated by the solvent vapor and dehydration aspects of the invention. With reference to the drawing, apparatus is illustrated that is suitable for use in the solvent vapor washing aspect. An electrically operated heater 10 is used for vapor generation. Boiler 11 is supplied with the selected solvent such as water and heated therein to produce water vapor. Pressure relief valve 12 is provided for the release of excessive pressure should a stoppage occur somewhere in the system. Treatment column 13 is connected to the vapor generator by conduit 14. Alfalfa hay is packed in the outer concentric area 15 of column 13. Steam vapor is introduced and distributed through vapor spreader column 16 from ports such as those shown at 17. The steam vapor moves through the surrounding alfalfa hay, thence outwardly to condenser 18 into reservoir 19 where the contaminated condensate can be appropriately disposed of or process for reuse by a suitably technique.

In column 13 suitable insulation is provided to maintain the steam vapor in the vapor phase and without condensation on the alfalfa hay. As previously noted, contaminants on the hay having a vapor pressure at the temperature of the steam vapor will vaporize and be carried away by a type of steam distillation, leaving the hay substantially free of contamination. The vaporized contaminant is found in a condensed condition in reservoir 19.

Using equipment of the above type, chopped, mixed and composited alfalfa hay samples were processed utilizing a vapor volume of about 20 litres per kilogram of alfalfa hay. Four solvents were serially employed on separate hay samples, viz.

pertane pentane
benzene
isopropanol
water

The hay contained contamination comprising DDT and other related chlorinated hydrocarbon insecticides (RCH) in the levels shown in Table I below. It is noted that the percentage loss of contamination residue from the several vapor treatments are:

| pentane | 73% |
| benzene | 97% |
| isopropanol | 93% |
| water | 86% |

TABLE I

Removal of DDT-RCH Residues from Alfalfa Hay by Solvent Vapor Washes

SAMPLES MEAN DDT-RCH (p.p.b.)

| | Pentane | Benzene | Isopropyl Alcohol | Water |
|---|---|---|---|---|
| Hay before treatment | 560 | 560 | 560 | 560 |
| Hay after vapor wash treatment | 153 | 16 | 42 | 81 |
| Percent loss of residue by vapor washing | 73 | 97 | 93 | 86 |

The effectiveness of the alkali-alkanol chemical treatment to cause decomposition of the molecular structure of pesticides is demonstrated by the following example:

Ladino clover seed screenings from a seed crop were employed to which 1 p.p.m. of Aramite was added. A solution of 34 milliliters of ethanol and 6 milliliters of water containing 10 grams of potassium hydroxide was provided for treatment of the seed screenings. To this solution 5 grams of the seed screenings were added and refluxed for one-half hour. The seed screenings were extracted in benzene, and the benzene analyzed by conventional gas-liquid chromatographic procedures. In the seed screenings sample treated by the above technique no Aramite was detected. A control sample analyzed by the same procedure except for the alkali treatment showed the presence of the expected level of Aramite.

The alkali-alkanol decontamination procedure is promoted by the presence of heat. Best results are obtained where the application of the solution to the plant materials being treated is made with the solution at about 30° C. or higher, and preferably above 70° C.

In a large scale operation the plant materials being treated can be contacted with the liquid in any suitable manner such as by spraying or dipping the plant material into a bath. Following the chemical treatment the alkali-alkanol solution is suitably removed by washing in fresh tap water to remove traces of the solution. If appropriate the plant material can be maintained after washing with substantial moisture content and dehydrated for further contamination removal. If additional treatment is not required, the water can simply be drained and the plant material dried in any of the usual manners for preservation purposes such as by sundrying or commercial dehydration.

The effectiveness of dehydration will be illustrated in the following example. Alfalfa hay samples were obtained from fields in Yolo County, California. These fields had not been treated with pesticides during the previous season so the residue found is from accidental contamination. Chopped, mixed and composited hay samples were sub-sampled for use in the various experiments.

Where the water content level of the hay samples was not increased prior to dehydration and a dry heat in an oven at 100° C. for 12 hours was applied, relatively small benefit was obtained. Only when the pesticidal residue level was initially very high, was any real effect obtained and then the reduction was not more than a 34 percent loss of contaminant residue. Thus alfalfa hay containing DDT and related chlorinated hydrocarbons of an initial concentration of 560 parts per billion was reduced to only 370 parts per billion with 12 hours of heating at 100° C. With hay having 153 parts per billion of the same residue, no reduction in the residue was observed with such heat treatment.

On another green chop alfalfa hay sample containing 84 percent moisture and 560 p.p.b. DDT-RCH, the same oven heating resulted in a 75 percent loss of pesticidal residue. In comparison, airdried green chop containing 5-10 percent moisture resulted in no significant residue loss on oven heating, thus illustrating the significance of establishing a water content of 75 percent or greater prior to dehydration.

In the preferred embodiment, the plant materials to be dehydrated are substantially soaked and saturated prior to dehydration. Utilizing this principle, a hay sample was soaked in distilled water until it was saturated by adding water to cover the plant material. The samples were then heated at 100° C. in an oven. The mean residue obtained after analysis showed an 86 percent loss of pesticidal residue, thus illustrating the advantage of a substantial excess of moisture in the sample prior to dehydration.

In the preferred embodiment, dehydration is executed with the use of conventional commercial dehydration equipment such as the drum-drying equipment now being utilized in the agricultural industry. In such a technique dehydration consists of rapidly heating the contaminated plant material such as alfalfa at a temperature above about 2000° F. for a relatively short period of time of about 2–5 minutes. Not only is the process sufficiently fast for commercial purposes, being capable of processing several tons per hour, but the reduction in residues is substantial.

To illustrate the last concept, a green chop which initially contained 213 parts per billion of DDT and related chlorinated hydrocarbons was processed through drum-type dehydration equipment at inlet temperatures of 1800°–2300° F. and an outlet temperature of 300° F. for 3–5 minutes. The dried product showed a 55 percent loss of the pesticidal residues.

The high-heat short time dehydration technique is applicable to decontamination of pesticidal residues which might arise from an accidental drift. If the contamination is in the 1–2 parts per million range, the material can be consistently dehydrated for a loss of contamination of 50 percent or more. In this event the dehydrated material could become a marketable commodity without further processing. If the contamination level were substantially higher, one or more of the other techniques utilized herein could be coupled with the dehydration.

While one embodiment of the invention has been shown and described, it will be apparent that other adaptations and modifications can be made without departing from the true spirit and scope of the invention.

We claim:

1. A method for reclaiming a plant type animal feed that has been contaminated with a pesticide to reduce the contamination level to an amount suitable for animal use comprising: providing an animal feed contaminated with a pesticide, establishing a water content in said contaminated feed of at least about 75 percent by weight thereof, and then rapidly dehydrating the feed by exposing it to an elevated temperature above about 1800° F. for a time sufficient to substantially dry the feed.

2. A method in accordance with claim 1 wherein said dehydration is executed by exposing the feed to said elevated temperature for about 2–5 minutes.

3. A method in accordance with claim 1 wherein sufficient water is combined with said feed to saturate the feed before said dehydration.

4. A method in accordance with claim 1 and including the steps, prior to said dehydration, of applying aqueous alkali at an elevated temperature, and then washing the feed with water to remove alkali therefrom, said steps serving to leave a water content in said feed of at least of about 75 percent by weight in preparation for said dehydration step.

5. A method in accordance with claim 4 wherein said aqueous alkali includes a lower alkanol in combination therewith and the aqueous alkali pH is at least about 9.

6. A method in accordance with claim 5 wherein said alkanol comprises about 50–95 percent by weight of the aqueous alkali-alkanol combination.

7. A method in accordance with claim 1 and including the steps, prior to said dehydration, of flowing a preselected volume of carrier gas in contact with said feed while maintaining substantially all of said carrier gas during said contact in the gas phase, said carrier gas selected from the group consisting of water vapor and organic solvent vapors, flowing the carrier gas out of contact with said feed, maintaining said carrier gas at least during said contact at a temperature at which the pesticide contamination on said feed has an appreciable vapor pressure, the flow of said carrier gas out of contact with said feed, thereby including vaporized pesticide and reducing the contamination of said feed.

8. A method in accordance with claim 7 wherein the volume of said carrier gas is preselected to cause at least a 50 percent reduction in the pesticide concentration in said feed.

9. A method in accordance with claim 8 wherein said carrier gas volume is approximately 20 litres per kilogram of feed.